(12) United States Patent
Kuhn et al.

(10) Patent No.: US 10,677,888 B2
(45) Date of Patent: Jun. 9, 2020

(54) RADAR DETECTOR WITH MULTI-BAND DIRECTIONAL DISPLAY AND ENHANCED DETECTION OF FALSE ALERTS

(71) Applicant: Escort Inc., West Chester, OH (US)

(72) Inventors: John Kuhn, Cincinnati, OH (US); Jeff Stevens, Liberty Township, OH (US); Roy Coburn, Monroe, OH (US); Timothy A. Coomer, West Chester, OH (US)

(73) Assignee: Escort Inc., Chicago, IL (US)

( * ) Notice: Subject to any disclaimer, the term of this patent is extended or adjusted under 35 U.S.C. 154(b) by 643 days.

(21) Appl. No.: 15/278,728

(22) Filed: Sep. 28, 2016

(65) Prior Publication Data

US 2017/0090012 A1    Mar. 30, 2017

Related U.S. Application Data

(60) Provisional application No. 62/233,666, filed on Sep. 28, 2015.

(51) Int. Cl.
  *G01S 7/02*    (2006.01)
  *G01S 7/06*    (2006.01)
  (Continued)

(52) U.S. Cl.
  CPC ............. *G01S 7/022* (2013.01); *G01S 3/14* (2013.01); *G01S 7/003* (2013.01); *G01S 7/062* (2013.01); *G01S 7/4806* (2013.01)

(58) Field of Classification Search
  CPC . G01S 3/14; G01S 7/003; G01S 7/022; G01S 7/062; G01S 7/4806; G01S 13/86;
  (Continued)

(56) References Cited

U.S. PATENT DOCUMENTS

| 3,956,626 A | 5/1976 | Ross |
| 5,021,961 A | 6/1991 | Ross et al. |

(Continued)

FOREIGN PATENT DOCUMENTS

| CN | 201718054 U | 1/2011 |
| CN | 101889215 B | 5/2013 |

(Continued)

OTHER PUBLICATIONS

Beamberboy, Radar detector interface to iPhone, blog entry, Tuesday, Aug. 25, 2009, www.trapster.com, printed on Nov. 5, 2009.

(Continued)

*Primary Examiner* — Timothy X Pham
(74) *Attorney, Agent, or Firm* — K&L Gates LLP (57) ABSTRACT

An enhanced radar detector in one example displays a source direction of one more detected signals simultaneously with a frequency band of the detected signal. In another embodiment, a method detects a location of a false alert source to suppress alerts emanating from the location. A geographic location of a first mid-ship point of a detected radar signal in a vehicle traveling in a first direction are identified/recorded. The geographic location of a second mid-ship point of a detected signal is also identified/recorded in a vehicle traveling in a second different direction. The recorded geographic locations/directions of travel are uploaded to a host server, or evaluated within the radar detector, to identify a false source and mark a false source at an intersection of the first and second midlines. The marked false source location can be used in a detector and/or downloaded to multiple detectors via a social network.

8 Claims, 6 Drawing Sheets

(51) Int. Cl.
*G01S 7/48* (2006.01)
*G01S 3/14* (2006.01)
*G01S 7/00* (2006.01)

(58) Field of Classification Search
CPC ........ G01S 11/02; G01S 13/60; G01S 17/023; G08G 1/052; G08G 1/0967; G08G 1/0962; G08G 1/096716
USPC .......................................................... 342/20
See application file for complete search history.

(56) References Cited

U.S. PATENT DOCUMENTS

| | | |
|---|---|---|
| 5,151,701 A | 9/1992 | Valentine et al. |
| 5,206,651 A | 4/1993 | Valentine et al. |
| 5,218,467 A | 6/1993 | Ross et al. |
| 5,229,947 A | 7/1993 | Ross et al. |
| 5,250,951 A | 10/1993 | Valentine et al. |
| 5,300,932 A | 4/1994 | Valentine et al. |
| 5,510,793 A | 4/1996 | Gregg, III et al. |
| 5,515,042 A | 5/1996 | Nelson |
| 5,515,402 A | 5/1996 | Chester |
| 5,784,021 A | 7/1998 | Oliva |
| 5,815,092 A | 9/1998 | Gregg, III et al. |
| 5,859,628 A | 1/1999 | Ross et al. |
| 5,938,717 A | 8/1999 | Dunne et al. |
| 5,977,884 A | 11/1999 | Ross |
| 6,118,403 A | 9/2000 | Lang |
| 6,265,989 B1 | 7/2001 | Taylor |
| 6,266,617 B1 | 7/2001 | Evans |
| 6,384,776 B1 | 5/2002 | Martin |
| 6,400,304 B1 | 6/2002 | Chubbs, III |
| 6,442,485 B2 | 8/2002 | Evans |
| 6,449,540 B1 | 9/2002 | Rayner |
| 6,469,653 B1 | 10/2002 | Haynes |
| 6,480,144 B1 | 11/2002 | Miller et al. |
| 6,567,035 B1 | 5/2003 | Elliott |
| 6,675,085 B2 | 1/2004 | Straub |
| 6,748,322 B1 | 6/2004 | Fernandez |
| 6,845,317 B2 | 1/2005 | Craine |
| 6,895,324 B2 | 5/2005 | Straub |
| 6,943,723 B2 | 9/2005 | Kim et al. |
| RE39,038 E | 3/2006 | Fleming, III |
| 7,042,345 B2 | 5/2006 | Ellis |
| 7,271,760 B2 | 9/2007 | Bartosik et al. |
| 7,301,494 B2 | 11/2007 | Waters |
| 7,471,236 B1 | 12/2008 | Pitt et al. |
| RE40,653 E | 3/2009 | Fleming, III |
| 7,576,679 B1 | 8/2009 | Orr et al. |
| 7,702,044 B2 | 4/2010 | Nallapureddy et al. |
| 7,764,219 B2 | 7/2010 | Pitt et al. |
| RE41,905 E | 11/2010 | Fleming, III |
| 7,899,450 B2 | 3/2011 | Pitt et al. |
| 7,965,222 B2 | 6/2011 | Pitt et al. |
| 7,999,721 B2 | 8/2011 | Orr |
| 8,099,466 B2 | 1/2012 | Tenereillo |
| 8,185,132 B1 | 5/2012 | Katpelly et al. |
| 8,255,155 B1 | 8/2012 | Crane et al. |
| 8,373,588 B2 | 2/2013 | Kuhn |
| 8,515,414 B2 | 8/2013 | Pitt et al. |
| 8,525,723 B2 | 9/2013 | Orr et al. |
| 8,842,004 B2 | 9/2014 | Kabler et al. |
| 8,970,422 B2 | 3/2015 | Washlow et al. |
| 9,132,733 B2 | 9/2015 | Washlow et al. |
| 9,135,818 B2 | 9/2015 | Washlow et al. |
| 2003/0052797 A1 | 3/2003 | Rock et al. |
| 2003/0214430 A1 | 11/2003 | Rusted et al. |
| 2003/0218562 A1 | 11/2003 | Orr |
| 2004/0107037 A1 | 6/2004 | Straub |
| 2004/0254729 A1 | 12/2004 | Browne et al. |
| 2005/0242984 A1 | 11/2005 | Waters |
| 2006/0089792 A1 | 4/2006 | Manber et al. |
| 2006/0132349 A1* | 6/2006 | Stern ............... G01S 7/022 342/20 |
| 2007/0035632 A1 | 2/2007 | Silvernail et al. |
| 2007/0109187 A1 | 5/2007 | Murphy |
| 2007/0216521 A1 | 9/2007 | Guensler et al. |
| 2009/0016418 A1 | 1/2009 | Silver et al. |
| 2009/0092284 A1 | 4/2009 | Breed et al. |
| 2010/0157061 A1 | 6/2010 | Katsman et al. |
| 2010/0214148 A1 | 8/2010 | Kuhn |
| 2010/0250369 A1 | 9/2010 | Peterson et al. |
| 2010/0317420 A1 | 12/2010 | Hoffberg |
| 2011/0149933 A1 | 6/2011 | Pitt et al. |
| 2012/0268306 A1 | 10/2012 | Coburn et al. |
| 2012/0326889 A1 | 12/2012 | Kabler et al. |
| 2013/0009760 A1 | 1/2013 | Washlow et al. |
| 2013/0194381 A1 | 8/2013 | McMahon et al. |
| 2013/0207829 A1 | 8/2013 | Kabler et al. |
| 2013/0211707 A1 | 8/2013 | Washlow et al. |
| 2013/0214939 A1* | 8/2013 | Washlow ............. G01S 7/003 340/901 |
| 2014/0043182 A1 | 2/2014 | Valentine et al. |
| 2014/0225764 A1 | 8/2014 | Jarvis |
| 2014/0368601 A1 | 12/2014 | deCharms |
| 2015/0123833 A1 | 5/2015 | Kabler et al. |
| 2015/0123834 A1 | 5/2015 | Kabler et al. |
| 2015/0224929 A1 | 8/2015 | McCarthy et al. |

FOREIGN PATENT DOCUMENTS

| | | |
|---|---|---|
| GB | 2456782 A | 7/2009 |
| JP | 2003-132488 A | 5/2003 |
| JP | 2006-058191 A | 3/2006 |
| JP | 2006-171001 A | 6/2006 |
| JP | 2008-269178 A | 11/2008 |
| JP | 2009-097865 A | 5/2009 |
| JP | 2009-277059 A | 11/2009 |
| RU | 96951 U1 | 8/2010 |
| WO | 2000029869 A1 | 5/2000 |
| WO | 2001055744 A2 | 8/2001 |
| WO | 2010096760 A1 | 8/2010 |
| WO | 2011071826 A1 | 6/2011 |
| WO | 2011087714 A1 | 7/2011 |
| WO | 2014151793 A2 | 9/2014 |

OTHER PUBLICATIONS

What is Radar Active?, website, May 15, 2010, www.radaractive.com, as saved by Web.archive.org, printed on Jan. 21, 2013.
Amy Gilroy, Ford Prototype Car Talks to Other Cars, Jan. 26, 2011, www.ceoutlook.com, as printed on Feb. 3, 2011.
Tim Stevens, Ford's intelligent vehicles communicate wirelessly, shoot hula hoops out of tailpipes (video), Jan. 27, 2011, www.engadget.com, as printed on Jan. 21, 2013.
International Search Report and Written Opinion for PCT/US16/54168, 17 pages.

* cited by examiner

RADAR DETECTOR WITH MULTI-BAND DIRECTIONAL DISPLAY AND ENHANCED DETECTION OF FALSE ALERTS

CROSS-REFERENCE TO RELATED APPLICATION

This application claims the benefit under 35 U.S.C. 119(e) and priority to U.S. Provisional Patent Application No. 62/233,666 filed Sep. 28, 2015 entitled "RADAR DETECTOR WITH MULTI-BAND DIRECTIONAL DISPLAY AND ENHANCED DETECTION OF FALSE ALERTS" the disclosure of which is hereby incorporated by reference in its entirety.

FIELD

The present disclosure relates to police radar detectors and, more particularly, to enhancing the display features and false alert detection in a radar detector device.

BACKGROUND

Radar detectors warn drivers of the use of police radar, and the potential for traffic citations if the driver exceeds the speed limit. The FCC has allocated several regions of the electromagnetic spectrum for police radar use. The bands used by police radar are generally known as the X, K and Ka bands. Each relates to a different part of the spectrum. The X and K bands are relatively narrow frequency ranges, whereas the Ka band is a relatively wide range of frequencies. Within each of the bands, the spectrum is typically subdivided into a number of smaller range frequency blocks or sub-bands.

Radar detectors typically comprise a microwave receiver and detection circuitry that is typically realized with a microprocessor or digital signal processor (DSP). Microwave receivers are generally capable of detecting microwave components in the X, K, and very broad Ka band. In various solutions, either a microprocessor or DSP is used to make decisions about the signal content from the microwave receiver. Systems including a DSP have been shown to provide superior performance over solutions based on conventional microprocessors due to the DSP's ability to find and distinguish signals that are buried in noise. Police use of laser has also been countered with laser detectors, and products are now available that combine laser detection into a single product with a microwave receiver to provide comprehensive protection.

Methods of conditioning detector response are gaining importance, due to an increasing number of signals present in the X, K and Ka bands from products that are completely unrelated to police radar. These products share the same regions of the spectrum and are also licensed by the FCC. The growing number of such signals is rapidly undermining the credibility of radar detector performance. Radar detectors cannot tell the difference between emissions from many of these devices and true police radar systems. As a result, radar detectors are increasingly generating false alerts, reducing the significance of warnings from radar detectors. Commonly-assigned U.S. Pat. No. 8,525,723, which is incorporated herein by reference, provides a description of a number of stationary, unrelated microwave sources, which are also referred to herein as false sources or unknown sources.

Commonly-assigned U.S. Pat. No. 6,670,905 ("the '905 patent") and U.S. Pat. No. 9,279,881—both of which are incorporated herein by reference—describe systems and methods that aid in the management of unrelated sources, and permit a detector to dynamically improve its handling of unrelated sources. The '905 patent discloses a Global Positioning Satellite System (GPS) enabled radar detector that uses GPS to aid in the management of non-police-related or otherwise irrelevant sources of radar signals, permitting the detector to dynamically improve its handling of such sources and reduce false alerts. The detector references previously-stored geographically-referenced information on such sources, and compares the detector's current location to locations of known stationary false alert sources, to improve the handling of signals from those sources. When the detector is within a threshold distance of a stored false alert source, the detector suppresses alerts for frequency bands or sub-bands that correlate to the frequency of the known false alert source. False sources may be manually identified and "locked out" by the user, or may be automatically identified based upon multiple repeated encounters of the detector with the source at a particular geographic location. Thus, the GPS-enabled detector offers an electronic method for establishing current physical coordinates and using those coordinates to ignore false sources.

Systems embodying the '905 patent have been successfully commercialized by the assignee of this application, but these systems continue to face certain challenges. For instance, the detection and suppression of false sources relies primarily upon location data obtained by and stored in a single detector. This may be adequate when a vehicle repeatedly travels a similar path, such as during a daily commute to/from work or school. However, when following a new route, such as on a road trip or vacation, the detector lacks a store of stationary false alert source locations and, thus, may produce numerous false alerts. The '905 patent, notes the possibility that signal information can be obtained from outside sources, such as internet sites or other radar detectors, to address this problem. However, even in this solution the location of a stationary false source is identified based on data which only provides a rough estimate of the false source location. More accurate identification and lockout of false alerts requires more precise positioning data regarding the geographic location of non-police radar sources.

To respond to these challenges, the assignee and others have developed social networks through which drivers can share radar events and sightings of police into a social network, so that a warning can be delivered to other drivers approaching the area. Unfortunately, users of social networks often report police activities that are not actually speed traps, for example, social network users may warn of a police car that is driving with traffic, waiting at a traffic light on a cross street, or involved in other activities that are not characteristic of a fixed location speed trap. As recognized by the present inventors, alerts that can be confirmed, e.g., via radar detection, are more reliable.

Additionally, due to the increased number of false alert sources, the present inventors recognized that it is desirable to know the band of a detected signal. Knowing the band enables a driver to decide whether to discount an alert as likely emanating from a false source, as may be the case with many X-band signals; or to heed the alert and reduce speed, if the signal is in the Ka-band or a laser signal, which more commonly originate from a police radar source. Additionally, when receiving an alert, the present inventors recognize that it is desirable to know not only the signal band, but also the direction that the signal came from, since multiple signals may be received at the same time and accorded different levels of importance. For example, it may be much more significant to know that there is a Ka-band signal, particularly one originating from the direction of travel of the vehicle, rather than to know that there is an X-band signal originating behind the vehicle. Furthermore, when driving at a high rate of speed, such as on a highway, a driver needs to receive this information in as clear and concise a manner as possible, in order to be able to make a quick decision on how to respond. Accordingly, as recognized by the present inventors, it is desirable to have a radar detector with a display that conveys both signal band and direction simultaneously for one or more detected signals, and it may be desirable to have a display that provides multiple types of information through illumination of a single indicator.

SUMMARY

In light of the above and according to one broad aspect of an embodiment of the present disclosure, an enhanced radar detector display is provided which depicts the source direction of one more detected signals simultaneously with the frequency band of the detected signal. In one example, the radar detector includes a housing and a radar receiver for detecting radar signals integrated within the housing. Electronics for controlling the radar receiver and evaluating detected radar signals are also integrated within the housing. The electronics evaluate the detected radar signals to determine a band and source direction of the detected signals. A display in communication with the electronics includes one or more indicators having an appearance that varies to convey both direction and band type of a detected signal.

In one example, the one or more indicators may be illuminated in selected colors to communicate source direction and band of a detected signal. The indicators may have an arrow shape. In one example, one indicator can individually depict both band type and source direction of a detected radar signal. In one example, the display may include four orthogonally-spaced arrows, one or more of the arrows being illuminated in a selected color to indicate band type and source direction of one or more detected radar signals.

According to another broad aspect of another embodiment of the present disclosure, disclosed herein is a method of displaying characteristics of a received radar signal in a radar detector display. In one example, the method may include determining a source direction of the received radar signal; determining a frequency band of the received radar signal; determining a strength of the received radar signal; and concurrently showing source direction, band and signal strength in a combined display. In one example, the radar detector display may include multiple different colors, the colors varying to visualize different band types.

According to another broad aspect of another embodiment of the present disclosure, disclosed herein is a method of using one or more radar detectors to identify a physical location of a radar source, the radar detectors comprising a radar receiver for detecting radar signals and signal processing electronics for controlling the radar receiver and evaluating detected radar signals. In one example, the method may include identifying and recording a geographic location of a first mid-ship point of a detected radar signal in a vehicle traveling in a first direction during operation of a radar detector; identifying and recording a geographic location of a second mid-ship point of a detected radar signal in a vehicle traveling in a second direction different from the first direction during operation of a radar detector; uploading the recorded geographic location of the first and second mid-ship points and first and second directions of travel to a host server; and evaluating coordinates and directions of the first and second mid-ship points to identify first and second midlines for a false source, and marking a false source at an intersection of the first and second midlines.

In one example, the first direction of travel may be substantially perpendicular to the second direction of travel. The coordinates of the first and second mid-ship points may be used for suppressing an alert of the false source in a radar detector. The method may also include marking a location of a false source at an intersection of the first and second midlines when the radar signal detected at the first and second mid-ship points are of similar frequency.

According to another broad aspect of another embodiment of the present disclosure, disclosed herein is a method of detecting a location of a non-police radar source and communicating the location to a network of radar detectors. In one example, the method may include receiving a geographic location and direction of travel of a first mid-ship point of a first radar signal detected in a vehicle traveling in a first direction; receiving a geographic location and direction of travel of a second mid-ship point of a second radar signal detected in a vehicle traveling in a second, different direction; evaluating coordinates and directions of travel of the geographic locations of the first and second mid-ship points to identify midlines for a false source, and marking a false source location at an intersection of the first and second midlines; and downloading geographic coordinates for the marked false source location to one or more radar detectors. The method may also include receiving frequency information of the first and second radar signals, and evaluating received frequency information of the first and second radar signals to determine whether a common source location generated the first and second radar signals.

According to another embodiment of the present disclosure, an enhanced method is disclosed for detecting the location of a false alert source in order to suppress alerts to signals emanating from the location. In one example, a method may use one or more radar detectors to identify a physical location of a radar source. The radar detectors include a radar receiver for detecting radar signals and signal processing electronics for controlling the radar receiver and evaluating detected radar signals. The method may include identifying and recording a geographic location of a first mid-ship point of a detected radar signal in a vehicle traveling in a first direction during operation of a radar detector. The geographic location of a second mid-ship point of a detected signal is also identified and recorded in a vehicle traveling in a second different direction. The recorded geographic locations of the first and second mid-ship points and first and second directions of travel may be uploaded to a host server, or evaluated within the radar detector itself. In either case, the coordinates and directions of the first and second mid-ship points are evaluated to identify first and second midlines for a false source, and a false source may be marked at an intersection of the first and second midlines. The marked false source location can be used in a detector and/or downloaded to multiple detectors via a social network.

In this manner, one example of the present disclosure provides for recording and analyzing detector data gathered while traveling in different directions to better hone in on the physical location of radar sources. This data may be combined, e.g., in a detector or in a common server connected to several detectors, for identifying and localizing received signals emanating from the same source location. The geographical coordinates for these common source locations can be distributed to multiple detectors through a social network or other communications method, to enable vehicles traveling a roadway for the first time to identify and suppress a false source.

In one example, a radar detector combines band type, signal strength and source direction in a single symbol on the display.

Other embodiments of the disclosure are described herein. The features, utilities and advantages of various embodiments of this disclosure will be apparent from the following more particular description of embodiments as illustrated in the accompanying drawings.

DETAILED DESCRIPTION

Figure 1:
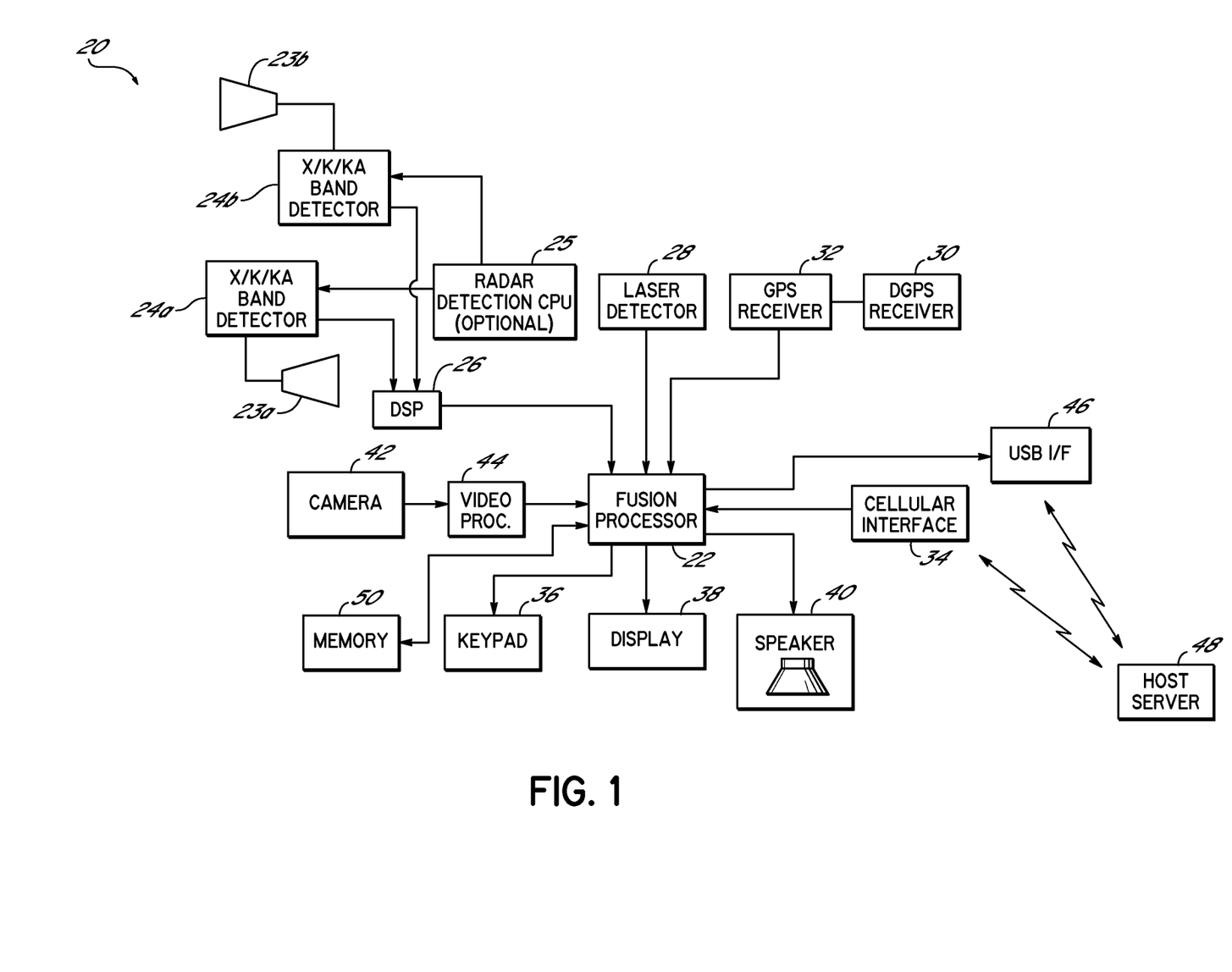
FIG. 1 is a block diagram of components of an exemplary police radar detector, in accordance with an embodiment of the present disclosure.

FIG. 1 illustrates an exemplary radar detector 20 which features a processor 22, such as but not limited to a fusion processor, for controlling all functions of the detector unit. Processor 22 receives information on radar signals from a microwave receiver, which includes a forward-facing antenna horn 23a coupled to a microwave receiver 24a, and a rearward-facing antenna horn 23b coupled to a microwave receiver 24b. In one embodiment, the microwave receivers may use the digital frequency synthesis methods described in U.S. Pat. No. 8,988,272, which is hereby incorporated herein by reference. As illustrated, each antenna horn 23a and 23b may be coupled via its own microwave path to a common digital signal processing system (DSP) 26 for performing digital signal identification and isolation in the manner described in the '272 patent.

Receivers 24a and 24b are coupled to processor 22 via digital signal processor (DSP) 26. Microwave receiver 24 and DSP 26 may utilize any of the techniques known in the art for detection of radar signals, for rejecting noise, and increasing discrimination between actual and spurious police radar signals. Further, receiver 24 and DSP 26 may be controlled by an optional second CPU 25, which can enable additional signal evaluation beyond that which is possible using a DSP.

Processor 22 is further connected to a laser detector 28 for detecting police light detection and ranging (LIDAR) signals. Laser detector 28 may be omnidirectional, or may include a forward-facing detecting diode and a rearward facing detecting diode to provide forward and rearward signal strength information to processor 22. Processor 22 is further connected to a GPS receiver 32 and/or a separate differential GPS (DGPS) receiver 30, such that differential GPS methodologies may be used where beacon signals are available.

Processor 22 executes a stored program, found in integrated or off-chip electrically erasable programmable read only memory (EEPROM), flash memory, or masked read only memory (ROM) 50. The processor is programmed to manage and report detected signals in various ways depending on its stored program, including by one or more of the methods, operations, steps and functions described herein.

Processor 22 is coupled to a cellular interface 34 to permit social network interaction with servers and data from other radar detectors. In one embodiment, cellular interface 34 comprises a Bluetooth or other 802.1x compliant radio for connecting to a cellular phone, smart phone, or other cellular device, which may operate on the control of a separate application, such as the assignee's "Escort Live" smartphone app. In another embodiment, cellular interface 34 may itself comprise a cellular radio for direct connection to cell towers. Other communication technologies may also be used for social network interaction, such as satellite telephony, mesh networking via wifi, Bluetooth, 802.1x radio of other kinds, or other standards.

The radar detector further incorporates a user input keypad or switches 36. Operational commands are conveyed by the user to processor 22 via the keypad. Processor 22 is further coupled with display 38, which comprises one or more light emitting diodes for indicating various status conditions, and an alphanumeric and graphical display for conveying detector information to a user, as will be described in more detail below. This display may be monochromatic, but in embodiments described below the display is a color display, e.g. using OLED technology, to enhance the information which may be presented. A speaker 40 is also provided to enable processor 22 to deliver audible feedback to a user under various alert conditions. Processor 22 may further optionally include a camera 42, positioned on a front-facing, side facing or rear facing surface of the device, and a video processor 44, for processing video or still images from camera 42.

In one example, processor 22 is further coupled to a Universal Serial Bus (USB) interface 46 that provides a means for uploading and downloading information to and from processor 22. USB interface 46 may be used to automate the assimilation of coordinate information into data structures in memory 50. USB interface 46 may also be used to interface the detector to a separate host computer or product application containing a larger storage capacity than available from internal memory. USB interface 46 may also be used for the purposes of firmware upgrades. From time to time updates and bug fixes may become available, e.g. through a manufacturer website. USB interface 46 enables the user to apply the appropriate firmware upgrade or bug fix. USB interface 46 may also be used to add other user waypoints.

Figure 2:
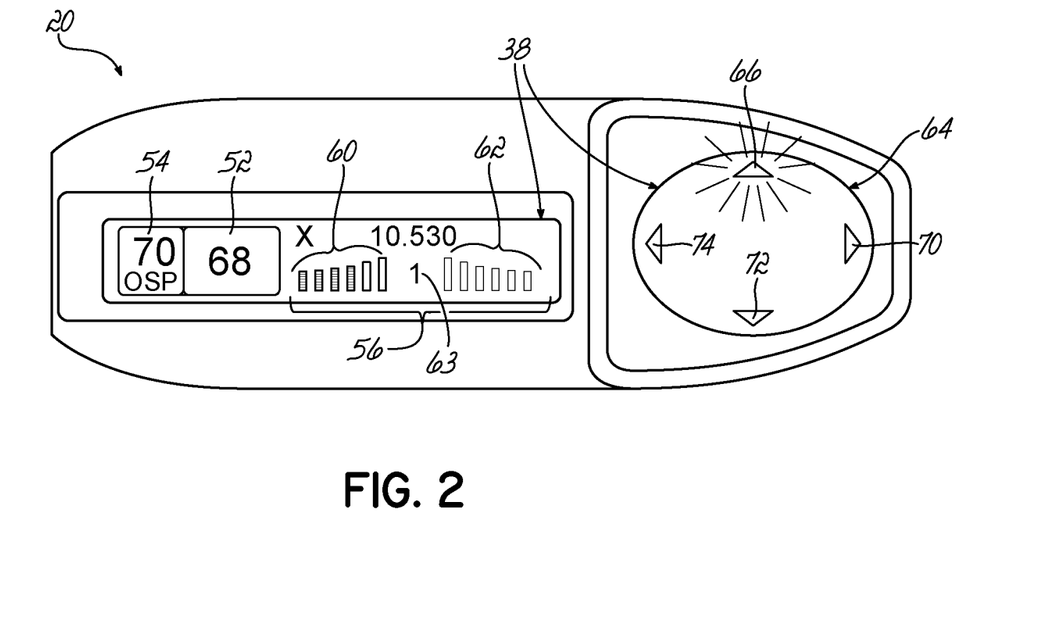
FIG. 2 depicts a radar detector display in a first exemplary display mode, in accordance with an embodiment of the present disclosure.

Referring now to the example of FIG. 2, a first mode for display 38 of radar detector 20 will now be described. In each of the exemplary modes described herein, display 38 is a multi-color OLED and/or multi-color discrete LED's, having a number of different icons and graphical symbols for visually alerting the vehicle operator of detected radar signals, as well as vehicular speed data. As shown in FIG. 2, a speed indicator 52 on the display shows the current speed or velocity of the vehicle. An overspeed alert indicator 54 is located next to the speed indicator 52. Overspeed alert 54 can be preset by the vehicle operator to provide a warning when the vehicle travels over a specified speed. If the vehicle travels at a speed in excess of the overspeed limit preset in detector 20, the appearance of speed indicator 52 can change to alert the driver to the excessive speed.

Display 38 further includes a combined signal band and strength panel 56 for depicting or displaying characteristics of a received radar signal, such as display band and signal strength of a received radar signal. Panel 56 includes a band indicator identifying a particular band of one or more received signals. The band type and frequency can optionally be displayed on panel 56, as shown for example by the "X" and "10.530" in FIG. 2. In the example of FIG. 2, display 38 shows the strength of a single, X-band radar signal originating from in front of the vehicle. Panel 56 further includes a graphical representation of signal strength, which can take any number of forms such as, for example, a bar graph as shown. One set of bars, shown at 60, indicates signal strength in the front of the vehicle, while a second set of bars 62 indicates signal strength at the rear of the vehicle. The individual bars may be illuminated to indicate strength, with an increasing number of bars being illuminated as the strength of the received signal increases. When the radar detector 20 is aligned in substantially the same direction as the motor vehicle in which it is mounted, the direction of the radar source relative to the detector is the same as that of the source relative to the motor vehicle (e.g., in front of, to the rear of, to the side of, etc.). In the exemplary display mode of FIG. 2, the left set of bars 60 is illuminated indicating that the detected signal is originating from the front of the vehicle. Finally, display panel 56 may include a source count 63, which indicates the number of sources being received. The source count is "1" in the example of FIG. 2, indicating that only one source is being received. In case more than one signal is received, the signal strength information presented in panel may be configured to represent the strongest signal in the highest priority band, where X is the lowest priority band, K is the medium priority band, and Ka and Laser are the highest priority, in one example.

In one example, display 38 may also include a source direction indicator 64, which may for example comprise four multi-color LEDs. Source direction indicator 64 visually displays the direction of a detected signal relative to the vehicle. In particular, referencing the direction indicator 64, a source direction can be determined relative to a vehicle in which the radar detector is operating, as discussed below in reference to FIG. 3.

In the example shown in FIG. 2, direction indicator 64 includes a first directional arrow 66 for indicating radar sources in front of the detector, a second directional arrow 70 for indicating sources to the right of the detector, a third directional arrow 72 for indicating sources located to the rear of the detector and a fourth directional arrow 74 for indicating sources to the left of the detector. In operation, processor 22 will determine, based on the detected radar signals, the control signals to activate the correct one or more directional arrows 66, 70, 72, 74 of direction indicator 64. The directional arrows 66, 70, 72, 74 may be orthogonally-spaced, as shown in the examples of FIGS. 2, 4, 5 and 6.

In one example, each of the directional arrows 66, 70, 72 and 74 may be illuminated in different colors such as but not limited to the colors of green, blue or red, as selected to indicate the radar band of the detected signal. For example, directional arrow 66 may be illuminated in a green color to indicate that an X-band signal is being detected predominantly from the forward direction. Similarly, a directional arrow may be illuminated in a blue color to indicate that the detected signal is in the K-band, and/or a directional arrow may be illuminated in a red color to indicate that the detected signal is in the Ka-band or is a laser signal. Additional colors may be utilized to identify additional detected radar bands or sub-bands, or to provide different colors for detected signals in the Ka and laser bands.

In one embodiment, four equally spaced source direction indicators 66, 70, 72, 74 are used to show how the direction of the detected radar signal can be visualized in the display panel. If desired, the relative direction of the signal source may be indicated using greater (or lesser) numbers of directional arrows in order to depict the source direction with greater specificity.

Figure 3:
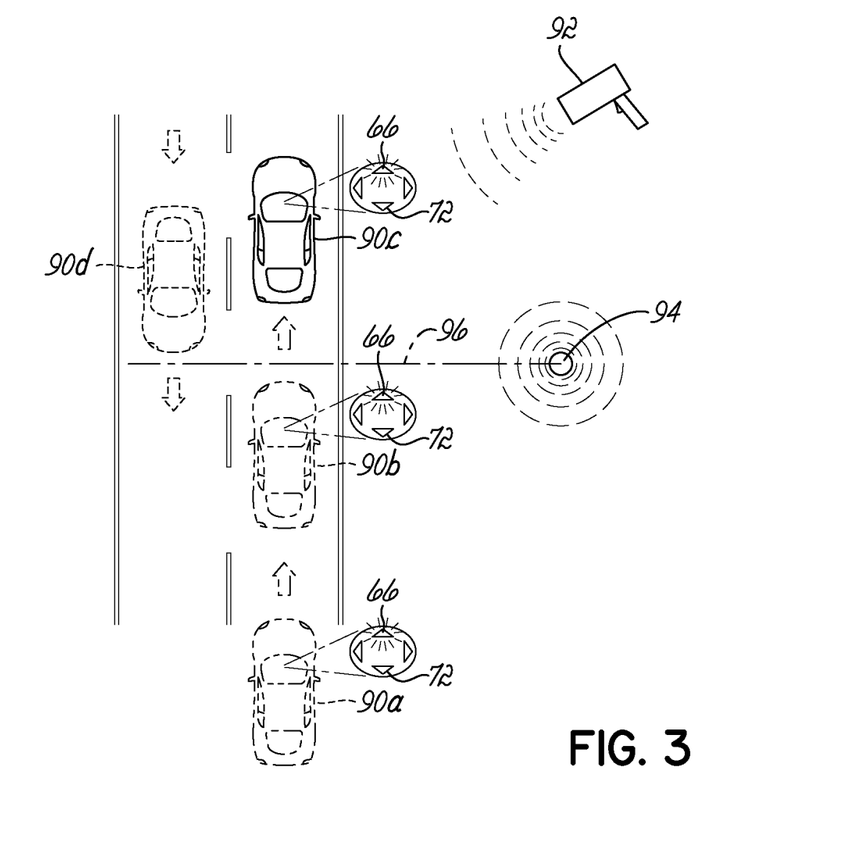
FIG. 3 is an illustration of a vehicle receiving radar signals from a police radar source and a false radar source, during different times of travel and different directions of travel.
Figure 4:
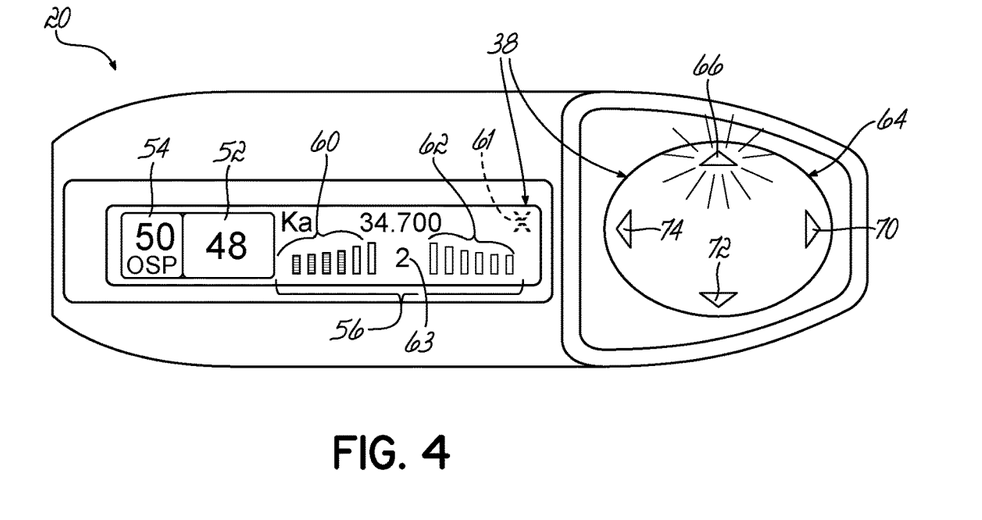
FIG. 4 depicts a radar detector display in another example display mode, in accordance with an embodiment of the present disclosure.

Referring to the example of FIGS. 3 and 4, in one example a vehicle travels forward from position 90a through positions 90b and 90c, and the detector 20 detects a Ka band police source 92 and an X band false source 94. At position 90a, both sources will be in front of the vehicle, and indicator 66 illuminates as seen in FIG. 4. Because Ka band is a higher priority band, indicator 66 is illuminated in a red color in one example. Furthermore, the strength of the Ka-band source is illustrated in area 60 of panel 56 of the display 38 in a red color. The Ka band signal is additional identified in panel 56 by the designation "Ka" and the frequency designation "34.700". A number "2" appears in the source count 63 to reflect that two signals are being received.

As the vehicle continues moving to position 90b, the false source 94 will be detected at approximately equal strength from the front and rear, and thus will be considered to be to the side of the vehicle, while the police source 92 remains in front of the vehicle and is detected predominantly from the front. In this circumstance, directional arrow 66 remains illuminated in a red color to signify that a Ka-band signal is being detected from in front of the vehicle, and the signal strength and frequency of the Ka-band signal is presented in a red color in area 60 of the display 38. Thus, the illuminated directional arrow 66 is color matched with the bar graph 60 in panel 56. In this manner, the directional arrows and display areas 60 and 62 provide a concise, comprehensive visual depiction of the source direction, strength and band of a detected radar signal.

The X-band signal originating to the side of the vehicle is of lower priority and thus, in one embodiment, may not be reflected on the directional arrows, and similarly the strength of the X-band signal may not be presented in areas 60 and 62 because it is of lower priority than the K-band signal. The presence of the X-band signal will be notable, however, from the presence of a "2" in the source count area 63 in one example.

Continuing the scenario, when the vehicle reaches position 90c, the false source 94 will be detected predominantly behind the vehicle, while the police source 92 remains in front of the vehicle and is detected predominantly from the front. In this circumstance, directional arrow 66 remains illuminated in a red color to signify that a Ka-band signal is being detected from in front of the vehicle, and the signal strength and frequency of the Ka-band signal is presented in a red color in area 60 of the display 38. Thus, the illuminated directional arrow 66 is color matched with the bar graph 60 in panel 56. In this manner, the directional arrows and display areas 60 and 62 provide a concise, comprehensive visual depiction of the source direction, strength and band of a detected radar signal. Optionally, a letter "X" may be presented in area 61 of the display to indicate that an X band signal is originating from behind the vehicle, although its strength is not being displayed.

Figure 5:
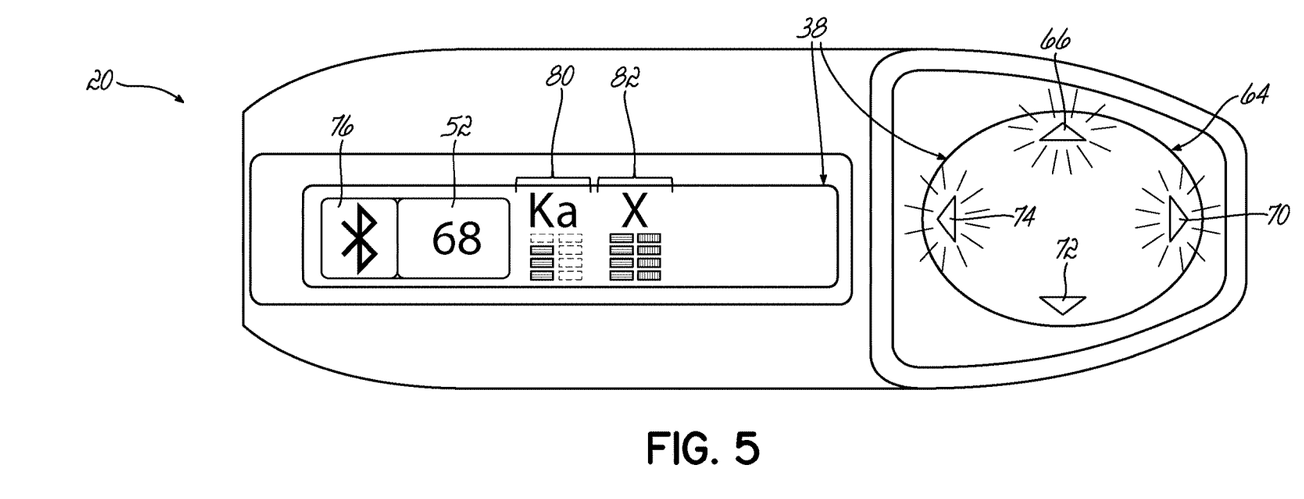
FIG. 5 depicts a radar detector display in another example display mode, in accordance with an embodiment of the present disclosure.

FIG. 5 depicts another exemplary mode for display 38. In this embodiment, the overspeed alert has been replaced with a Bluetooth indicator 76, to indicate that the radar detector has been paired with a smart phone app, such as the assignee's "Escort Live" smart phone app, but the app is not presently communicating (e.g., the app has not been launched on the smart phone). As before, the speed at which the vehicle is traveling is shown in display area 52.

In the FIG. 5 embodiment, radar signals in both the Ka-band and X-band have been detected, as in the scenario described relative to FIG. 4. However, in this embodiment, information relating to both signal bands is displayed. Specifically, the bar graphs 60, 62 of the FIG. 2/FIG. 4 display modes are replaced with bar graphs 80, 82 for each of the detected signals. Each bar graph 80, 82 includes two columns of bars for indicating the signal strength detected at the front and the rear of the vehicle, respectively. In the illustrated case, the Ka-band signal has been detected at the front of the vehicle, as indicated by the illumination of the first column of bars in graph 80, with the number of illuminated bars indicating the strength of the signal. The X-band signal has been detected at the side of the vehicle, as indicated by the illumination of both columns of bars in graph 82. This is the case which would occur, for example, at position 90b of FIG. 3. Each of the bar graphs 80, 82 may be illuminated in a color corresponding to the depicted band type, thus the bar graphs 80 would be depicted in a red color and the bar graphs 82 would be depicted in a green color.

As shown in the example of FIG. 5, the direction of detection of both Ka-band and X-band signals is further visualized through the illumination of multiple directional arrows in source indicator 64. In the display, front directional arrow 66 is illuminated in red, associated with the Ka-band, to convey that the Ka-band signal source is in front of the vehicle, and the side directional arrows 70, 74 are illuminated in the color green, associated with the X-band, to convey that the X-band signal source is located at a side of the vehicle. In one embodiment, to direct attention to the highest priority band in the in indicator 64, the directional indicator for the highest priority band may blink; thus in the illustrated case indicator 66 would blink in a blue color.

Figure 6:
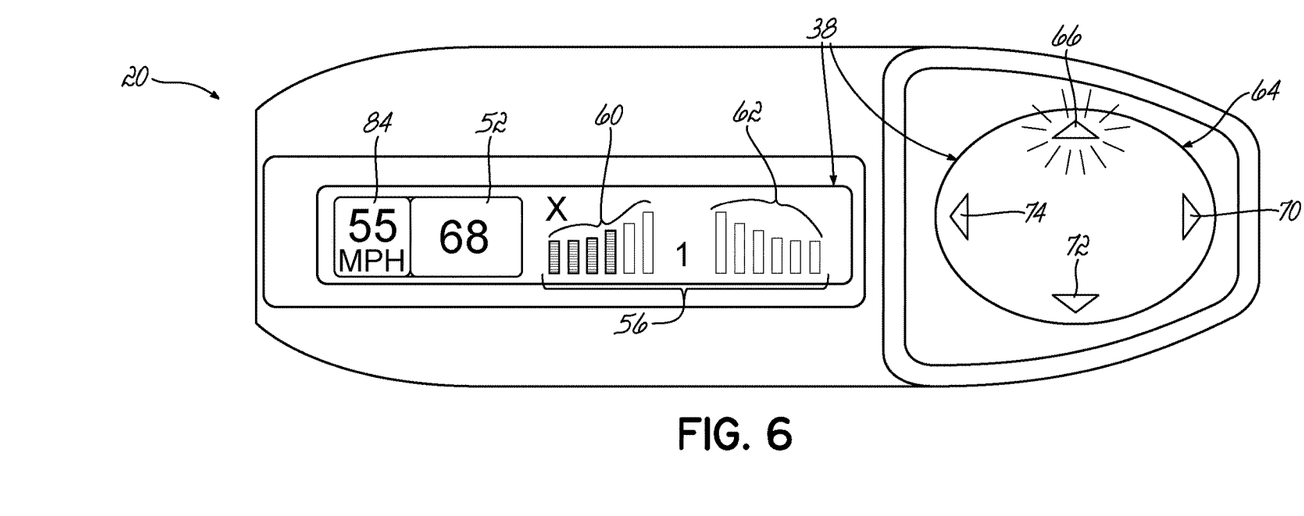
FIG. 6 depicts a radar detector display in another example display mode, in accordance with an embodiment of the present disclosure.

FIG. 6 illustrates another example of a mode for display 38. Similar to FIG. 2, in this mode the display shows signal strength information for only one signal, a single X-band signal originating in front of the vehicle. To indicate this information, the front bar graph 60 is illuminated in the color selected for indicating the X-band (e.g., green). Likewise, the forward directional arrow 66 is illuminated in the X-band color to show that an X-band signal as been detected in front of the vehicle. In addition to this information, the overspeed alert has been replaced in this view with the current posted speed limit, shown at 84. The posted speed limit can be displayed when detector 20 has been paired with a smart phone app, as described above, and the app is communicating ongoing updates to processor 22, via interface 34, as the vehicle travels.

FIGS. 2 and 4-6 display several exemplary modes for simultaneously informing a user of the source direction and band of a received signal using color and directional arrows. Other exemplary modes may also be used for combining signal source direction, band and strength without departing from the scope of the present disclosure. Furthermore, multi-band modes may be used in display panel 56 while signal-band modes are used on direction indicator 64, and vice-versa.

In addition to the multi-band directional indicators described above, detector 20 of the present disclosure may be configured to detect stationary false alert sources with increased accuracy. As described in the '905 patent referenced above, geographic coordinates of marked false sources are stored by processor 22 as tracking records in memory 50. Each of these records includes global positioning (GPS) coordinates of the location of the detected false source as determined by GPS receiver 32, and additional data such as the date/time that the source was encountered, counters for sub-bands or frequency blocks in each of the X, K and Ka bands, and the like. In one embodiment, further data on false alerts is captured, to allow the comparison of false source tracking records from multiple different paths of travel, either from the same vehicle or from multiple vehicles that are connected using a social network.

As in the detector described in the '905 patent, processor 22 gathers the physical locations of false signal detections, using physical locations determined from GPS receiver 32. The signal information from the radar detector including the detected signal band, and the frequency block of the detected signal are stored. Additionally, the detector records the travel direction of the vehicle at the point of false alert detection. This information is stored in memory 50 in the radar detector, where it may be subsequently compared to other records. Furthermore, this information may be uploaded via a social network for combination with similar records from other detectors. In one embodiment, one particular location that may recorded in a tracking record is the transition or mid-ship point, when the signal from the stationary source transitions from the front to the side of the vehicle, before continuing to the rear of the vehicle; that is, the mid-ship point is the center of the area at which the side directional indicators 70, 74 are illuminated.

Referring again to the example of FIG. 3, as noted above, as a vehicle travels in a first, Northerly direction through position 90a, police source 92 and false source 94 will both be detected as radar sources located in the front of the vehicle, and the front directional arrow 66 will be illuminated. As the vehicle reaches position 90b, approximately to the line 96 where the source 94 is mid-ship of the vehicle, the police source 92 will continue to be detected in front of the vehicle, but the false source 94 will be detected as positioned at the side of the vehicle. When this occurs, processor 22 will read the geographic coordinates from GPS receiver 32 and record those coordinates as the mid-ship location of false source 94. This location data will be recorded in a tracking record in memory 50, along with the direction of travel of the vehicle at the time that the mid-ship point was reached. The frequency of the false source signal will also be recorded in the tracking record. On a return trip in the opposite, Southerly, direction, as shown in FIG. 3, the detector in the vehicle may reach point 90d, and may again note the mid-ship location of the false source 94 as the car crosses dashed line 96, and update the existing tracking record, or create a second tracking record, to further enhance the available information on the physical location and frequency of false source 94.

A given detector 20 will detect the same signal at the same geographic coordinates and frequency block multiple times, and take records of each encounter, before the signal source is marked as a false source or "locked out". The use of repeated encounters with a stationary signal source prior to marking the source as a false source is described in greater detail in the '905 patent. The records generated herein, however, further include a mid-ship point and direction of travel for that mid-ship point, which provide greater specificity regarding the false source than was available in the '905 patent.

When detector 20 is connected to a social network, such as the assignee's "Escort Live" smart phone software application, processor 22 may upload the tracking records of the marked false sources to a host server 48, either as those sources are being detected, or after a source has been repeatedly detected and marked false. Additional tracking records may also be uploaded from other radar detectors connected to the social network. The uploaded records can then be compiled in a database of multiple vehicle encounters with stationary radar sources. Host server 48 shown in FIG. 1 includes a processor for performing a data analysis on the tracking records to detect records having similar geographic coordinates and frequency blocks. In particular, the host processor flags tracking records for false sources having similar frequency blocks and location coordinates within a specified physical area. For example, the host processor may compare records having geographic coordinates located within a ½ mile area. The host processor may then compare the travel direction of each vehicle that recorded data, as well as the frequency block and mid-ship coordinates recorded at each false source detection, in order to pinpoint more precisely the physical location of the false source.

Figure 7:
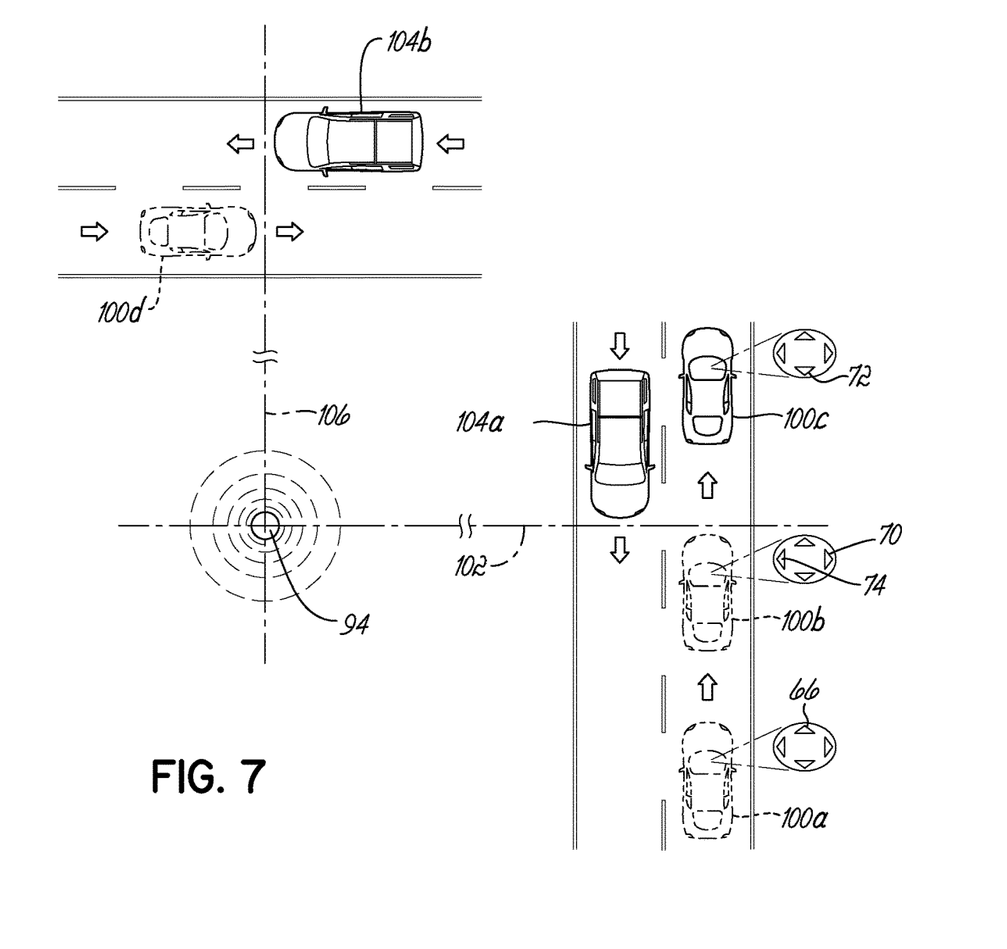
FIG. 7 is an illustration of radar detectors of the type described herein detecting radar signals from a false radar source while traveling in different directions.

FIG. 7 depicts another example of how the geographic coordinate data and travel direction can be used to more accurately determine the physical location of a false alert source. As illustrated in the example of FIG. 7, as a vehicle travels through positions 100*a*, 100*b* and 100*c* past a likely false source 94, a radar detector in the vehicle records position data for the source, the frequency block, and the direction of travel, (which is depicted as a Northerly direction), as the vehicle passes a mid-ship point indicated by dashed line 102. The radar detector in the vehicle stores the data from the encounter with source 94 in a tracking record that is held in memory and/or uploaded to host server 48. Additional data for likely false source 94 may also recorded when the same vehicle, or a second vehicle also carrying a suitable radar detector consistent with the inventive principles herein, passes through position 100*d*. This second pass, in an Easterly direction, creates a record of position data for source 94 at the mid-ship point, indicated by dashed line 106, associated with a direction of travel in an Easterly direction. As shown in FIG. 7, as one or more vehicles encounter the false source while traveling in various directions, additional tracking records for source 94 may be created, recording the direction of travel along with the mid-ship coordinates and frequency block of the detected signal.

By comparing the tracking records obtained from multiple passes of source 94 by the same vehicle in different directions, processor 22 may refine its understanding of the location of source 94. Similarly, the host server 48 may combine tracking records from multiple vehicles that pass source 94 and detect and upload those records.

More specifically, the mid-ship coordinate detected by a pass of a false source may be combined with the direction of travel to create a mid-line for the location of the source, approximately represented by lines 102 and 106. The source can then be pinpointed where the midlines intersect, as shown by the intersection at source 94 of mid-ship lines 102, 106. Notably, the midlines from multiple encounters need not been a perpendicular angles, and furthermore, data from more than two passes at more than two directions may be averaged or combined to pinpoint the position of source 94 through triangulation. The intersection of midlines coordinates from multiple vehicles traveling in different directions, as shown in FIG. 7, indicates a likely physical location of a stationary false source, when the signals associated with the position coordinates are within the same frequency block.

The marked false source records from multiple vehicles can be continually monitored and compared by the host server. The host server can detect intersections within the coordinate data from multiple vehicles, and use the intersections to build a data store of false alert source locations. Because the false source locations will have been confirmed by comparing coordinate data from multiple vehicles, the actual physical location of the false source can be more accurately estimated. The false source locations can be continually monitored and updated within the host computer, and the location data made available for downloading and use by any radar detector connected to the social network. Using intersecting points of positional data from multiple different radar detectors enables accurate detection of the location of a fixed false source. Using the multiple data points allows for determining which side of a vehicle, as well as the distance from the vehicle, that a false alert source is located, thereby enabling more accurate detection and lockout of false alert signals. Thus, a vehicle traveling later in time, which has no prior experience with the area of false source 94, may be programmed via the social network to suppress or modify the alert to source 94 when the vehicle reaches points 104*a* or 104*b* and detects a signal with a frequency, strength and/or direction consistent with the false source 94.

Figure 8A:
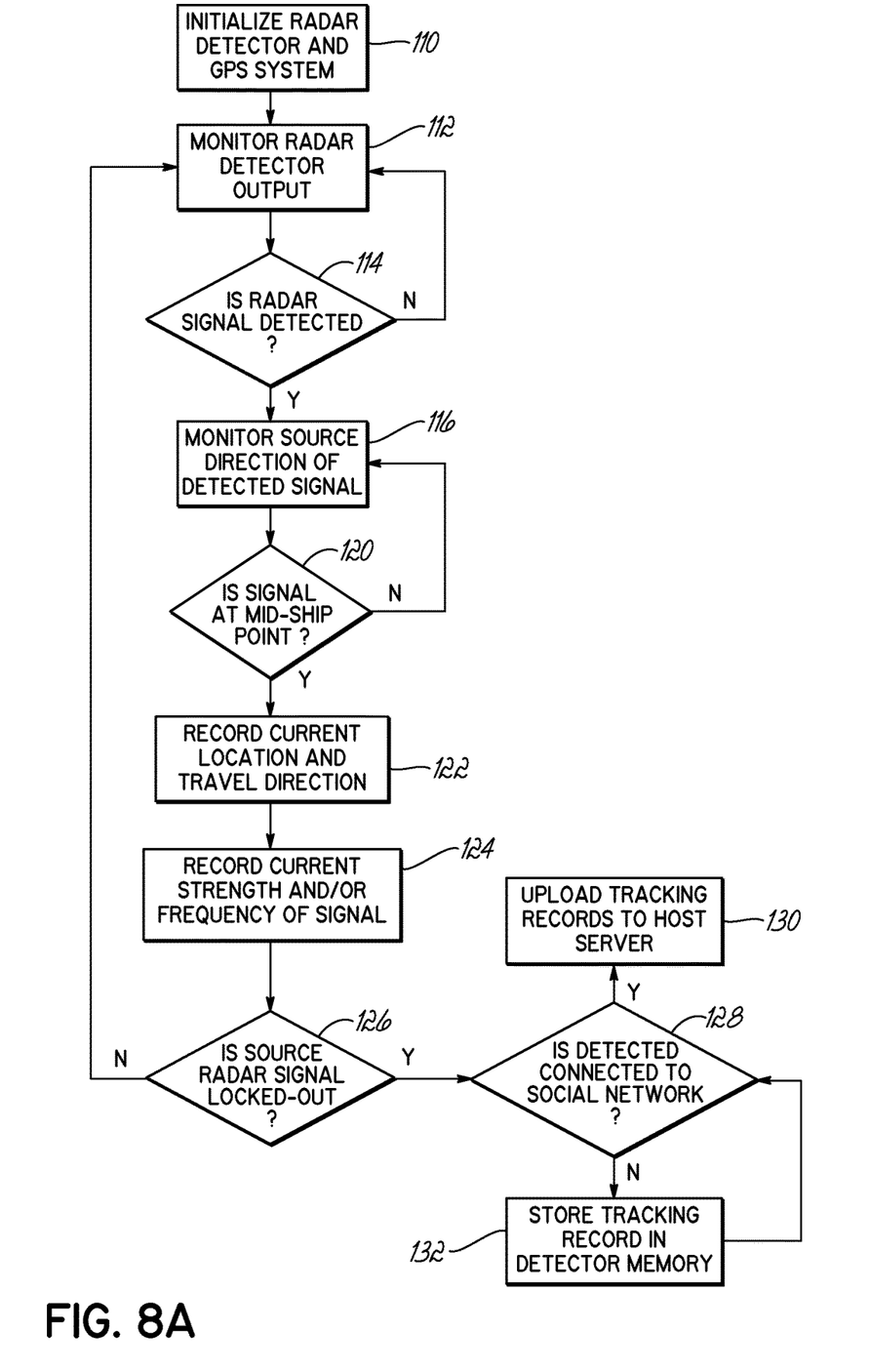
FIG. 8A shows a flow chart of example operations of the radar detector of FIG. 1 in performing a multi-vehicle evaluation of detected radar signals to locate a potential false source, in accordance with an embodiment of the present disclosure.
Figure 8B:
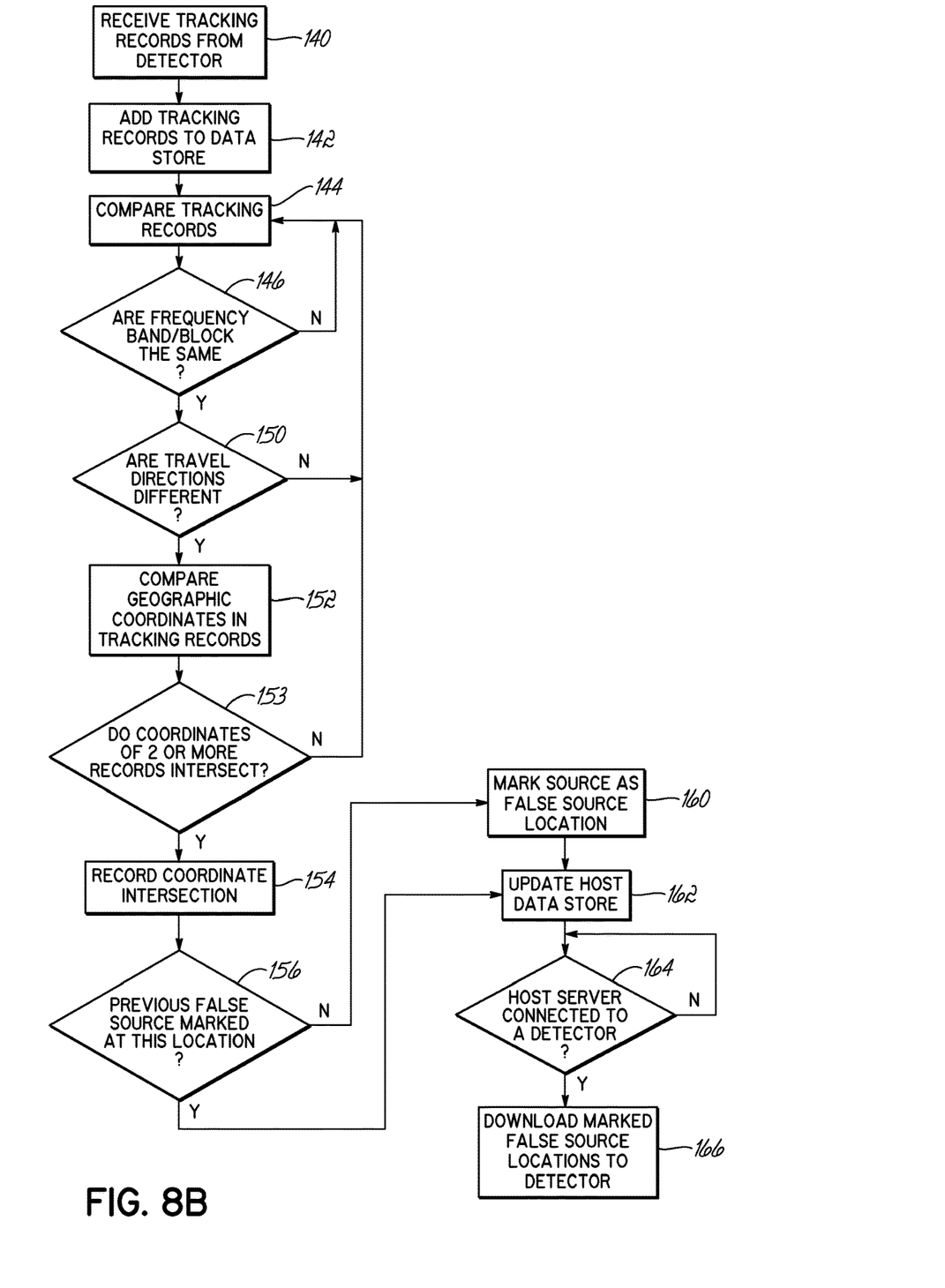
FIG. 8B shows a flow chart of example operations of the host server in performing a multi-vehicle evaluation of detected radar signals to locate a potential false source, in accordance with an embodiment of the present disclosure.

Referring now to FIGS. 8A and 8B, the example operations of processor 22 and host server 48 are described in greater detail. Processor 22 performs a main loop of steps during regular operation of the radar detector to carry out the functions, operations, processes and features of the present disclosure. When processor 22 is initialized, i.e. when power is applied to the GPS enabled radar detector, the detector device is initialized in step 110. This initialization step includes performing diagnostic checks on the various circuitry illustrated in FIG. 1 to insure its proper operation, as well as initialization of the GPS receiver 32 to insure GPS signals can be received accurately by processor 22. At step 112, radar detection circuitry 24, 25 is accessed to obtain information on radar signals currently being received by the radar detector. If a radar signal is detected in step 114, processor 22 uses position information from GPS receiver 32 in conjunction with the signal information from detection circuitry 24 to monitor the source direction of the signal in step 116. When the source direction reaches a mid-ship point, as determined at step 120, the processor records a current location and travel direction in a tracking record at step 122, and records the current strength and/or frequency or frequency block in a tracking record in the tracking record at step 124.

At step 126, processor 22 evaluates tracking records using the position coordinates and the frequency block of the detected signal to determine whether a source has previously been identified and marked at the location, and further, whether the source has been "locked out". If not, control is passed to operation 112. If the location is a marked false source, the detector will suppress alerting at that location. Furthermore, when the detector is connected to the social network (step 128), the processor 22 may upload the tracking records and/or the records of "locked out" sources to host server 48 (step 130). This may be done at the time the signal is determined to be false and "locked out", or at a suitable later time. If detector 20 is not connected to the social network at the time a record is created or updated, record may be stored in the detector memory for later updating to the social network, as indicated at step 132.

FIG. 8B illustrates examples of steps performed within host server 48 to process marked source tracking records from multiple vehicles in order to compile a data store, database or data cloud of marked false sources that are available to all of the detectors connected to the social network. Initially, host server 48 receives a tracking record from a detector and stores the record in the server, as indicated in steps 140 and 142. The host server performs an analysis of the tracking records, at step 144, as new tracking records are added to the data store in order to identify new false source locations. The host processor compares the frequency of the detected signal to frequencies of prior records, at step 146 to focus on radar sources emanating signals in the same frequency block. Next, for the sources having similar frequency, the processor compares the travel direction at step 150. For the tracking records having different travel directions, the host processor compares mid-ship coordinates and midlines, at step 152, to determine whether there is an intersection between the midlines (step 153). The host processor uses the intersection point to specify more precise coordinates for the false source at step 154. A check is made at step 156 to compare the previous data gathered at the intersection coordinates. If the false source location is new, a record of the false source is added to the data store at steps 160 and 162. If the false source location had previously been identified, then the record of the false source is updated at step 162. At steps 164, 166, host server 48 provides the updated data store of false source locations for downloading to detectors connected through the social network. The individual detectors may then use the updated false alert source locations to lockout additional radar sources, or to refine the geographic location of a previously identified locked-out source.

Various embodiments of the present disclosure have been described and some of those embodiments have been elaborated in substantial detail. However, the scope of the disclosure is not to be limited by these embodiments which are presented as exemplary and not exclusive. The scope of the inventions being claimed is set forth by the following claims.

What is claimed is:

1. A method of using one or more radar detectors to identify a physical location of a radar source, the radar detectors comprising a processor, a radar receiver for detecting radar signals, and signal processing electronics for controlling the radar receiver and evaluating the radar signals detected by the radar receiver, the method comprising:
   a. identifying and recording, with the processor, a first geographic location of a first mid-ship point of a first detected radar signal in a first vehicle traveling in a first direction during operation of a first radar detector;
   b. identifying and recording, with the processor, a second geographic location of a second mid-ship point of a second detected radar signal in a second vehicle traveling in a second direction different from the first direction during operation of a second radar detector;
   c. uploading, with the processor, the first geographic location of the first mid-ship point and the second geographic location of the second mid-ship point and the first direction of travel and the second directions of travel to a host server; and
   d. evaluating, with at least one of the processor and the host server, the first geographic location of the first mid-ship point and the second geographic location of the second mid-ship point and the first direction of travel and the second direction of travel to identify first and second midlines for a false source, and marking the false source at an intersection of the first and second midlines.

2. The method of claim 1, wherein the first direction of travel is substantially perpendicular to the second direction of travel.

3. The method of claim 1, wherein the first geographic location of the first mid-ship point and the second geographic location of the second mid-ship point are used for suppressing an alert of the false source in a radar detector.

4. The method of claim 1, further comprising marking, with at least one of the processor and the host server, a location of the false source at the intersection of the first and second midlines when the first detected radar signal and the second detected radar signal are of similar frequency.

5. A method of detecting a location of a non-police radar source and communicating the location to a network of radar detectors, the method comprising:
   a. receiving a first geographic location and a first direction of travel of a first mid-ship point of a first radar signal detected in a first vehicle traveling in a first direction;
   b. receiving a second geographic location and a second direction of travel of a second mid-ship point of a second radar signal detected in a second vehicle traveling in a second, different direction;
   c. evaluating the first geographic location and the first direction of travel of the first mid-ship point and the second geographic location and the second direction of travel of the second mid-ship point to identify midlines for a false source, and marking a false source location at an intersection of the midlines; and
   d. downloading geographic coordinates for the false source location to one or more radar detectors.

6. The method of claim 5, further comprising receiving frequency information of the first radar signal and the second radar signal, and evaluating the received frequency information of the first radar signal and the second radar signal to determine whether a common source location generated the first radar signal and the second radar signal.

7. A method of identifying a physical location of a false signal source for a radar detector for use in suppressing signals from the source, the radar detector comprising a processor, a radar receiver for detecting radar signals, and signal processing electronics for controlling the radar receiver and evaluating the radar signals detected by the radar receiver, the method comprising:
   a. identifying and recording, with the processor, a first geographic location and a first frequency information of a first mid-ship point of a first detected signal while traveling in a first direction during operation of the radar detector;
   b. identifying and recording, with the processor, a second geographic location and a second frequency information of a second mid-ship point of a second detected signal while traveling in a second, different direction during operation of the radar detector;

c. comparing, with the processor, the first geographic location and the first frequency information with the second geographic location and the second frequency information;
d. identifying, with the processor, midlines for the first detected signal and the second detected signal based on the first mid-ship point and the second mid-ship point and the first direction of travel and the second, different direction of travel, and marking a false source geographic location developed from an intersection of the midlines as the false signal source.

8. The method of claim 7 wherein the first direction of travel is substantially perpendicular to the second direction of travel.

* * * * *